United States Patent [19]

Mayska et al.

[11] Patent Number: 4,804,689

[45] Date of Patent: Feb. 14, 1989

[54] PROCESS FOR HOLDING AND FOAMING THERMOPLASTIC POLYPHENYLENE SULPHIDE ARTICLES AND THE RESULTANT PRODUCTS

[75] Inventors: Paul J. Mayska; Erhard Tresper, both of Krefeld, Fed. Rep. of Germany

[73] Assignee: Bayer Aktiengesellschaft, Bayerwerk, Fed. Rep. of Germany

[21] Appl. No.: 68,081

[22] Filed: Jun. 29, 1987

[30] Foreign Application Priority Data

Jul. 2, 1986 [DE] Fed. Rep. of Germany ....... 3622194

[51] Int. Cl.⁴ .................. C08J 9/06; C08G 75/14; B29C 67/22
[52] U.S. Cl. ..................... 521/89; 264/46.7; 264/54; 264/DIG. 5; 521/121; 521/180; 521/189
[58] Field of Search .................. 264/54, DIG. 5, 46.5, 264/46.7; 521/89, 134

[56] References Cited

U.S. PATENT DOCUMENTS

| | | |
|---|---|---|
| 3,892,686 | 7/1975 | Woo . |
| 3,998,767 | 12/1976 | Walton . |
| 4,032,683 | 6/1977 | Coale ................................. 428/315 |
| 4,370,292 | 1/1983 | Yanase et al. ............... 264/272.19 X |
| 4,471,247 | 9/1984 | Cotton ................................. 310/45 |
| 4,500,702 | 2/1985 | Ostlinning et al. ............... 528/388 |
| 4,595,748 | 6/1986 | Ostlinning et al. ............... 528/388 |
| 4,663,430 | 5/1987 | Ostlinning et al. ............... 528/388 |
| 4,695,594 | 9/1987 | Pressman ........................ 264/54 X |
| 4,714,576 | 12/1987 | Cotton et al. ................... 264/46.7 X |

FOREIGN PATENT DOCUMENTS

| | | |
|---|---|---|
| 894847 | 3/1972 | Canada . |
| 3318401 | 11/1984 | Fed. Rep. of Germany . |
| 3531361 | 9/1985 | Fed. Rep. of Germany . |

*Primary Examiner*—Philip Anderson
*Attorney, Agent, or Firm*—Gene Harsh; Joseph C. Gil; Aron Preis

[57] ABSTRACT

The present invention relates to a process for molding a foamed article comprising mixing a polyphenylene sulfide resin with about 0.1 to 10% of an oligomeric sulfone carbonate as a foaming agent and with 0.1 to 2% of a basic catalyst at a temperature of about 150° to 180° C. and then heating the resulting mixture at a temperature of 280°–350° C. to affect a reaction mixture and introducing the reaction mixture into a suitable mold for producing a foamed article.

4 Claims, No Drawings

PROCESS FOR HOLDING AND FOAMING THERMOPLASTIC POLYPHENYLENE SULPHIDE ARTICLES AND THE RESULTANT PRODUCTS

The present invention relates to a process for foaming thermoplastic polyphenylene sulphides with an Mw (weight-average molecular weight, measured in N-methylcaprolactam at 150° C. on the basis of calibration with aromatic polyesters) of 5,000 to 60,000, which is characterized in that oligomeric sulphone-carbonates of the formula (I)

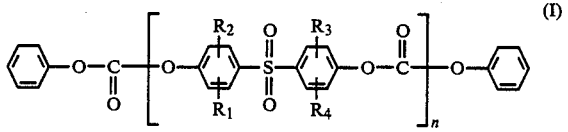

wherein
n is 2 to 10 and
$R_1$ and $R_4$ are identical or different and are H, chlorine, bromine, $C_1$-$C_{10}$-alkyl or $C_6H_5$,
are incorporated in amounts of 0.1% by weight to 10% by weight, preferably 3% by weight to 5% by weight, based on the total weight of (I) and the polyphenylene sulphide to be foamed, into the polyphenylene sulphides at temperatures of 150° to 180° C. and, after addition of basic catalysts in amounts of 0.1 to 2.0% by weight, based on the weight of the polyphenylene sulphide to be foamed, the mixture is then heated at temperatures of 280° C. to 350° C., preferably 300° C. to 320° C., for 3 minutes to 15 minutes and the reaction mixture is subsequently poured into the mould suitable for producing the polyphenylene foamed article.

Suitable equipment for foaming are injection-moulding machines with a needle seal nozzle or structural form moulding machines.

Suitable basic catalysts are sodium phenolates or diphenolates or potassium phenolates or diphenolates, such as, for example, bisphenol A disodium phenolate, or sodium or potassium salts of organic carboxylic acids, such as potassium benzoate or sodium benzoate.

Suitable moulds are those which are produced from aluminium alloys. They must be easy to vent. No other geometric requirements are imposed.

The oligomeric sulphone-carbonates of the formula (I) required for the process according to the invention are obtainable in a very pure form either by phosgenation of a mixture of the dihydroxydisulphones (Ib) wherein $R_1$ to $R_4$ have the meaning given for formula (I),

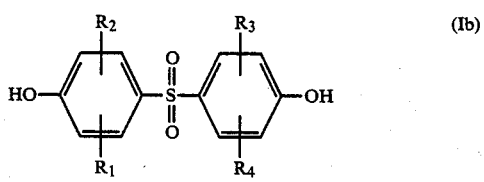

and phenol in a corresponding molar ratio of 2:2 or 3:2 and the like up to 10:2 (see also German Patent Application P No. 35 31 361.7 (Le A 24 000), page 3).

Another possibility for preparing the oligomeric sulphone-carbonates of the formula (I) in a pure form comprises reaction, in accordance with German Patent Application P No. 36 19 058.6 (Le A 24 378) of very pure biscarbonates of the formula (Ia), wherein $R_1$ to $R_4$ have the meaning given for formula (I)

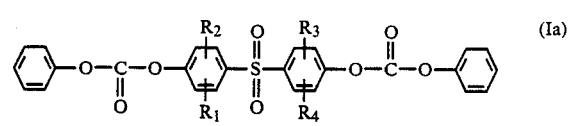

with neutral trans-esterification catalysts in amounts of 0.1 ppm to 10,000 ppm, preferably in amounts of 1 ppm to 1,000 ppm, based on the weight of (Ia), at temperatures of 150° C. to 350° C., preferably 300° C. to 330° C., over a reaction time of about 10 minutes to about 5 hours, preferably about 30 minutes to about 60 minutes, and removal by distillation, in a known manner, of the phenol and/or diphenolcarbonate formed, preferably under reduced pressure.

This trans-esterification can be carried out, for example, in a stirred kettle or kneader or in an extruder.

Suitable neutral trans-esterification catalysts for this are, for example, tetrabutyl titanate or antimony trioxide.

Further details can be obtained from German Patent Application P No. 36 19 058.6 (Le A 24 378).

The thermoplastic polyphenylene sulphides which have an $\overline{M}w$ of 5,000 to 60,000 and are to be foamed by the process according to the invention are known products. They are obtainable by known processes (see, for example, German Offenlegungsschriften (German Published Specifications) No. 3,243,189, No. 3,318,401 and No. 3,338,501).

Polyphenylene sulphide foams are described in DOS (German Published Specification) No. 2,324,175, polyphenylene sulphide being expanded by splitting off carbon dioxide or carbonyl sulphide from incorporated isocyanates or thioisocyanates. According to DOS (German Published Specification) No. 2,018,690, one type of foam, more a powder with a finely porous structure, is formed when polysulphides are prepared from very reactive episulphides.

The use, according to the invention, of the oligocarbonates of the formula (I) has the advantages to a high decomposition temperature and solubility of the cleavage products in the polyphenylene sulphide.

Polyphenylene sulphide foams, in particular those obtainable by the process of the present invention, are used industrially as injection moulded components in the electronics industry.

EXAMPLES

1. Preparation of an oligomeric sulphone-carbonate in accordance with Example 1 of German Patent Application P No. 36 19 058.6 (Le A 24 378).

47 g of bis(oxyphenyl) sulphone-di-(phenyl) carbonate which has been prepared from 1 mol of 4,4'-dihydroxydiphenyl sulphone and 2 mol of phenyl chlorocarbonate by a two-phase boundary process in a methylene chloride/water mixture at room temperature are melted together with 200 ppm of titanium tetraisopropylate. Splitting off of diphenyl carbonate starts at about 170° C. When this subsides, the temperature is increased slowly to the final temperature (320° C.). The reaction must be discontinued at the latest when the deteriorating vacuum indicates the start of decomposition.

The melt viscosity in Pa.s at 306° C. is 350. The molecular weight of $\overline{M}_w$=about 10,000 is determined by HPGPC (gel permeation chromatography) at 150° C. in N-methylcaprolactam, taking calibration by means of aromatic polyester as a basis.

The elemental analysis corresponds to the values calculated theoretically. The IR spectrum clearly shows a carbonate band at 1780 cm$^{-1}$.

2. Preparation of a polyphenylene sulphide foam 100 g of polyphenylene sulphide with an $\overline{M}w$ (measured in N-methylcaprolactam at 150° C. on the basis of calibration with aromatic polyesters) of 50,000, a glass transition temperature of 90° C. and a melt viscosity of 50 Pa.s, measured at 306° C. in a known manner, are worked with 1 g of the oligocarbonate of Example 1 in a kneader at 150° C. for 10 minutes and the mixture is then mixed with 0.0001 g (100 ppm) of the dipotassium salt of 2,2-bis-(4-hydroxyphenyl)-propane at 170° C. The mixture is then warmed to 350° C.

A foam is formed, the density of which is 0.9 g per cm$^3$.

We claim:

1. A process for molding a foamed article comprising
   (i) mixing at 150°–180° C. a polyphenylene sulphide resin and about 0.1 to 10% of a foaming agent conforming to

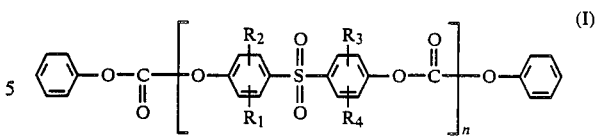

wherein n is 2 to 10 and $R_1$ to $R_4$ independently denote hydrogen, chlorine, bromine, $C_1$–$C_{10}$ alkyl or $C_6$–$H_5$, said percent being relative to the weight of said resin and said foaming agent,
   (ii) adding about 0.1 to 2%, relative to the weight of said polyphenylene sulphide resin, of at least one basic catalyst,
   (iii) heating the resulting mixture at a temperature of 280° to 350° C. for about 3 to 15 minutes to affect a reaction mixture at
   (iv) pouring said reaction mixture into a suitable mold for producing a foamed article, said polyphenylene sulphide being characterized in having a weight average molecular weight, measured in N-methylcaprolactam at 150° C. on the basis of calibration with aromatic polyesters of 5000 to 60,000.

2. A process according to claim 1, in which the oligomeric sulphone-carbonates of the formula (I) is incorporated in an amount of 3% by weight to 5% by weight.

3. A process according to claim 1, in which, following the addition of basic catalyst(s), the mixture is heated at a temperature of 300° to 320° C.

4. The foam article produced by the process of claim 1.

* * * * *